Feb. 23, 1971  G. P. STEFANICH  3,564,730
VISUAL AID FOR ILLUSTRATING ATOMIC AND MOLECULAR STRUCTURE
Filed June 6, 1969  3 Sheets-Sheet 1

INVENTOR.
GREGORY P. STEFANICH
BY
Carlsen, Carlsen, Sturm & Hicks
ATTORNEYS

United States Patent Office 3,564,730
Patented Feb. 23, 1971

3,564,730
VISUAL AID FOR ILLUSTRATING ATOMIC
AND MOLECULAR STRUCTURE
Gregory P. Stefanich, 516½ 3rd St. NW.,
Chisholm, Minn. 55719
Filed June 6, 1969, Ser. No. 831,135
Int. Cl. G09b 23/26
U.S. Cl. 35—18                                9 Claims

ABSTRACT OF THE DISCLOSURE

A spindle, a multiplicity of planar members, each of the planar members having a central hole acting as a nucleus and adapted to receive the spindle to mount the members thereon one upon the other, each of the planar members having indicia illustrating one or more electron orbitals thereon, the orbitals on a given planar member having a means distance from the nucleus differing from that on another planar member, the extent of the oribtals on each member outwardly of the nucleus indicating the mean distance of an electron from the nucleus, and relatively small disc means for indicating electrons on said planar members for selective illustration of an atom or collectively with said members combined to illustrate molecules.

SUMARY OF THE INVENTION

The invention relates to a device for illustrating the atomic structure of elements and compounds particularly for use in schools. It is an object of the invention to provide a device with which one may simply and easily illustrate the electron configuration and arrangement in atoms and molecules either by direct visual observation thereof or by projection therefrom by means of an overhead projector.

These and other more detailed and specific objects will be disclosed in the course of the following specifications, reference being had to the accompanying drawings, in which.

Figure 1:
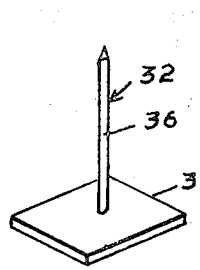
FIG. 1 is a perspective view of a spindle for mounting the discs of the invention illustrated herein.
Figure 2:
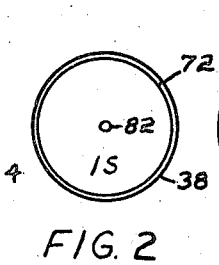
FIG. 2 is a plan view of a transparent disc on which the first shell and the S subshell are indicated.
Figure 3:
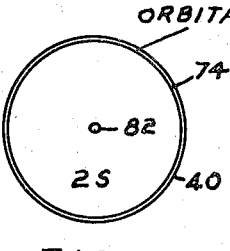
FIG. 3 is a plan view of a transparent disc on which the second shell and S subshell are indicated.
Figure 4:
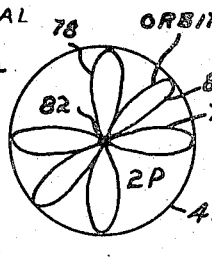
FIG. 4 is a plan view of a transparent disc on which the second shell and the P subshell are indicated.
Figure 5:
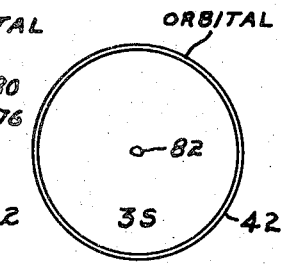
FIG. 5 is a plan view of a transparent disc on which a third shell and the S subshell are indicated.
Figure 6:
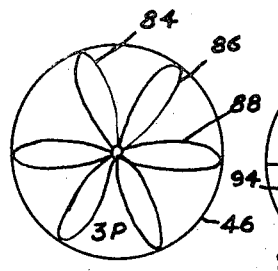
FIG. 6 is a plan view of a transparent disc on which the third shell and the P subshell are indicated.
Figure 7:
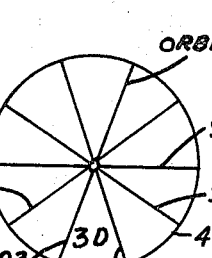
FIG. 7 is a plan view of a transparent disc on which the third shell and the D subshell are indicated but due to the complex formation of each orbital a straight line is used to indicate each orbital.

Referring to the drawings in particular, the device includes a spindle 32 having the base 34 and the pointed shaft 36 extended upwardly therefrom. Also provided at the transparent planar members in the form of discs 38, 40, 42, 44, 46, 48, 50, 52, 54, 56, 58, 60, 62, 64, 66, 68 and 70 which illustrate shells and subshells. A shell indicates the distance an electron is away from the nucleus. A subshell indicates the form of the orbits of an electron pair. The disc 38 has formed on the outer periphery thereof the colored translucent narrow band 72 indicating an S orbital (1S) and the disc 40 has formed on the outer periphery thereof the colored translucent narrow band 74 indicating an S orbital in the second shell (2S). The disc 40 is the same as 38 but larger in diameter representing an orbital with a greater mean distance from the nucleus. The same is true relative to the other discs when the diameter thereof is larger.

The disc 42 has formed thereon three colored translucent figure eights 76, 78 and 80 each of which represent a P orbital. Disc 44 is the same as disc 38 but larger in diameter representing an orbital with a greater mean distance from the nucleus. In each disc there is formed the axial hole 82 for receiving the spindle 36 and which represents the central nucelus. Disc 46 is the same as disc 42 but larger in diameter representing orbitals 84, 86 and 88 with greater mean distances from the nucleus.

Figure 8:
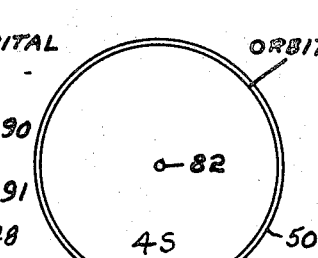
FIG. 8 is a plan view of a transparent disc on which the fourth shell and the S subshell are indicated.
Figure 9:
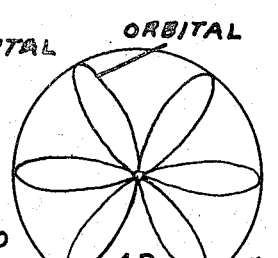
FIG. 9 is a plan view of a transparent disc on which the fourth shell and the P subshell are indicated.
Figure 10:
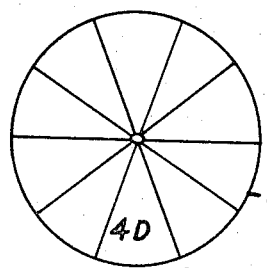
FIG. 10 is a plan view of a transparent disc on which the fourth shell and the D subshell are indicated, straight lines being used to indicate orbitals.
Figure 11:
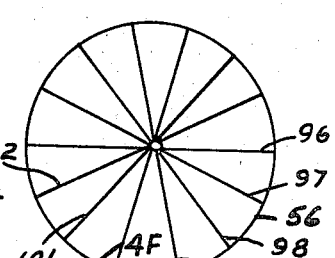
FIG. 11 is a plan view of a transparent disc on which the fourth shell and F subshell are indicated but due to the complex shape of each orbital a straight line is used to indicate each orbital as in FIG. 7.
Figure 12:
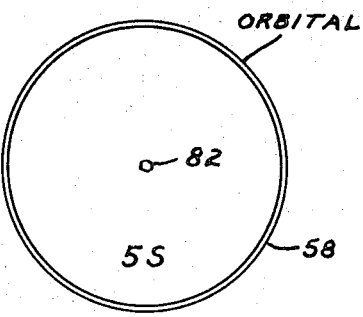
FIG. 12 is a plan view of a transparent disc on which the fifth shell and the S subshell are indicated.
Figure 13:
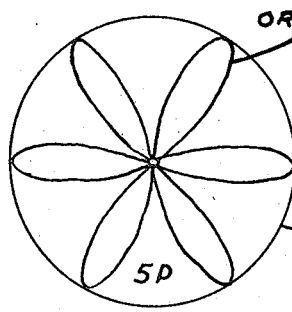
FIG. 13 is a plan view of a transparent disc on which the fifth shell and the P subshell are indicated.
Figure 14:
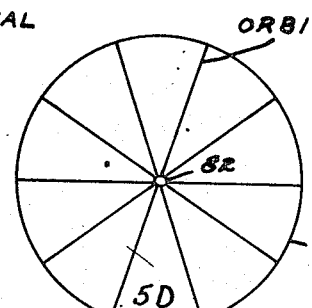
FIG. 14 is a plan view of a transparent disc on which the fifth shell and the D subshell are indicated, straight lines being used to indicate orbitals.
Figure 15:
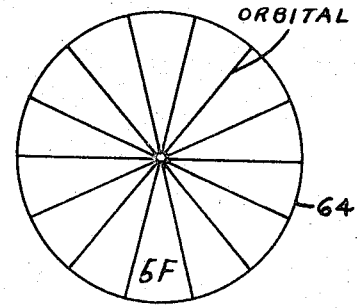
FIG. 15 is a plan view of a transparent disc on which the fifth shell and the F subshell are indicated but due to the complex shape of each orbital a straight line is used to indicate each orbital as in FIGS. 7 and 11.
Figure 16:
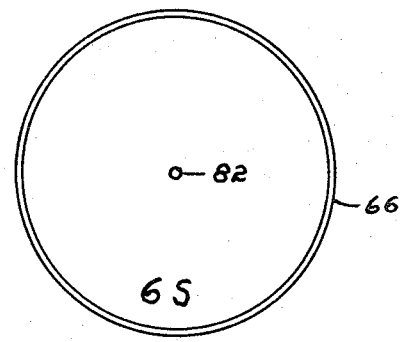
FIG. 16 is a plan view of a transparent disc on which the sixth shell and the S subshell are indicated.
Figure 17:
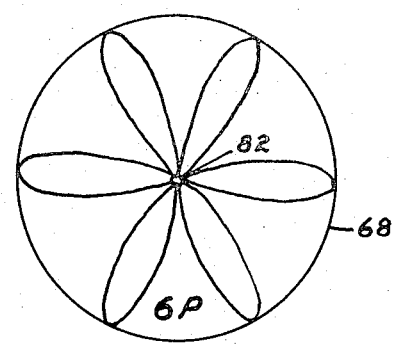
FIG. 17 is a plan view of a transparent disc on which the sixth shell and the P subshell are indicated.
Figure 18:
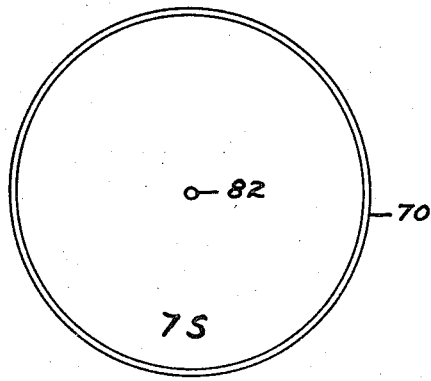
FIG. 18 is a plan view of a transparent disc on which the seventh shell and the S subshell are indicated.

Disc 48 has formed thereon five colored translucent lines 90, 91, 92, 93 and 94 each of which represents a D orbital which due to its complexity is represented on the disc by a straight line. Disc 50 of FIG. 8 is identical to discs 38, 40 and 44 but with a larger diameter for the reason stated regarding disc 40. Disc 52 is identical to discs 42 and 46 except that disc 52 is larger in diameter representing orbitals with greater mean distances from the nucleus. Disc 54 is identical to disc 48 except that the diameter thereof is greater. Disc 56 has formed thereon seven colored translucent lines 96, 97, 98, 99, 100, 101 and 102 each of which represents an F orbital which is too complex to be represented on the disc by other than a straight line.

Disc 58 is similar to discs 38, 40, 44 and 50 but with a larger diameter for the reasons stated relative to discs 38, 40, 44 and 50. Disc 60 is identical to discs 42, 46 and 52 except that disc 60 is larger in diameter representing orbitals with greater mean distances from the nucleus. Disc 62 is identical to disc 54 except that the diameter thereof is greater. Disc 64 is identical to disc 56 except that disc 64 is greater in diameter. Disc 66 is identical to discs 38, 40, 44, 50 and 58 but with a larger diameter for the reason stated with regard to disc 40. Disc 68 is identical to discs 42, 46, 52, 60 except that disc 68 is larger in diameter representing orbitals with greater means distances from the nucleus. Disc 70 is identical to discs 38, 44, 50, 58 and 66 but with a larger diameter for the reason stated regarding disc 40.

Figures 19, 20:
FIG. 19 is a plan view of a translucent colored disc representing an electron.
FIG. 20 is a plan view of a translucent disc of a color different from that of the disc of FIG. 19 representing an electron of opposite spin.

Also included are the colored translucent discs 104 and 106, FIGS. 19 and 20, which represent electrons and each of which has adhesive material on the back side and which may be attached to any of the aforementioned discs.

Figure 21:
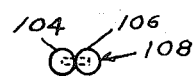
FIG. 21 illustrates a plan view of two electrons of different spin connected to illustrate a covalent bond or sharing of an electron pair.

In FIG. 21 is illustrated the electron pair indicated as 108 hereinbefore defined.

Figure 22:
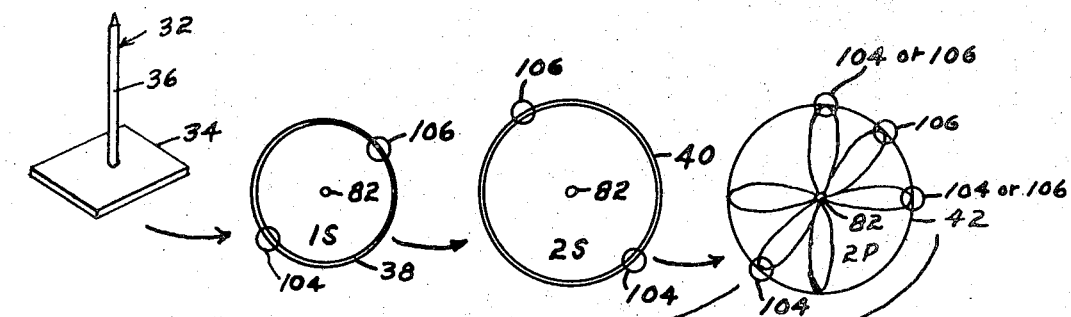
FIG. 22 is a view of a sequential buildup of an oxygen atom using the spindle and disc members described, the last view representing the combination of the discs and spindle illustrated in the previous views.
Figure 23:
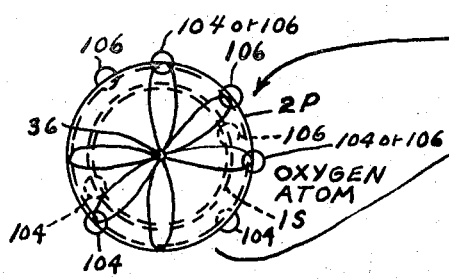
FIG. 23 is a sectional elevational view of the spindle and discs of FIG. 21 in assembled condition as in the last view in FIG. 21 whereby the same may be viewed directly or projected by an overhead projector.
Figure 23:
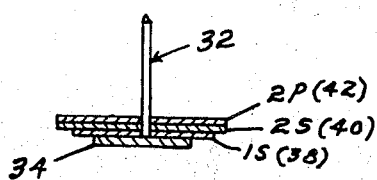

The device is used in the following manner. Let it be supposed that it is desired to illustrate an oxygen atom. First place disc 38 upon the spindle shaft 36 and attach electrons 104 and 106 to the edge thereof as in FIG. 22. Then place on shaft 36 disc 40 (2S) and attach electrons 104 and 106 to the edge thereof. Then place disc 42 on the shaft 36 and attach two pairs of electrons 104 and 106 as indicated in FIG. 22. The result of the above is the composite drawing at the lower left of FIG. 22 indicated as an oxygen atom. The combination of FIG. 22 is shown in section in FIG. 23. The device so produced as an oxygen atom may be projected on a screen using an overhead projector for easy viewing. The invention therefore provides a method whereby the atomic structure of elements may be built up and illustrated in a practical and convenient way.

Figure 24:
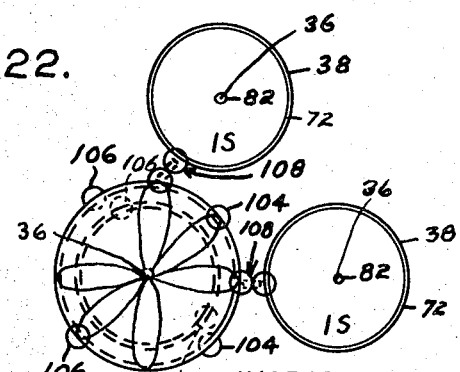
FIG. 24 is a plan view of a water molecule embodying the oxygen atom of FIG. 22 and two hydrogen atoms each on a separate spindle connected by covalent bond members shown in FIG. 21.

As a further example of use of the device, the formation of a molecule of water may be accomplished as follows and shown in FIG. 24. Using three spindles 36 an oxygen atom is formed as described above and shown in FIG. 22, and two hydrogen atoms may each share one electron pair 108 in a covalent bond with the oxygen atom to form the water molecule $H_2O$ as shown in FIG. 24 Each hydrogen atom is placed on a separate spindle as is the oxygen atom.

Figure 25:
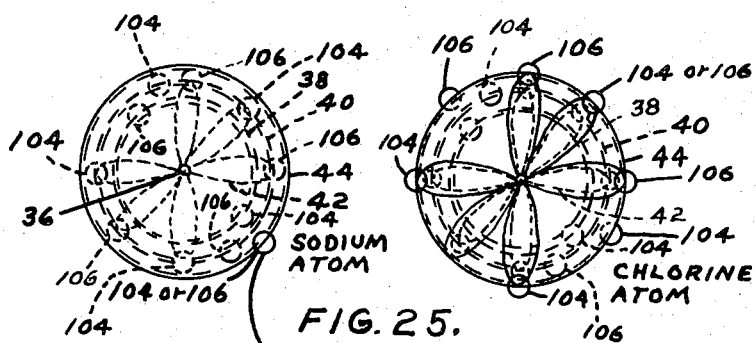
FIG. 25 is a plan view of a sodium atom and a chlorine atom.
Figure 26:
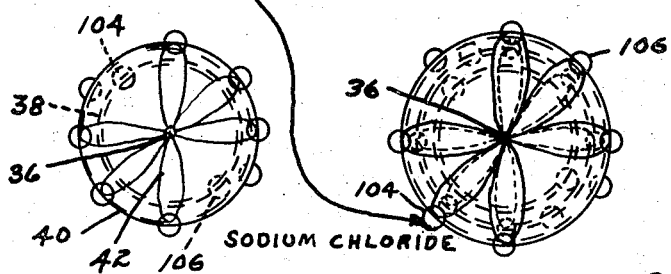
FIG. 26 illustrates a plan view of the molecule sodium chloride in which an electron from the sodium atom of FIG. 25 is shown as transferred to the chlorine atom.

In FIG. 25 a sodium atom and a chlorine atom are illustrated on separate spindles, each atom made up from the discs herein disclosed together with the discs illustrating electrons. In FIG. 26 the compound sodium chloride is illustrated showing the transfer of an electron from the outer shell of the sodium atom to the outer shell of chlorine atom indicated by the arrow leading from the sodium atom in FIG. 25 to the chlorine atom in FIG. 26. It will be seen that the invention provides a device whereby the atomic structure of a compound may be built up and graphically illustrated either by direct observation or an overhead projection. The present invention is adapted to give illustrated information on the molecular structure of all known compounds by using the devices disclosed.

Having now therefore fully illustrated and described my invention, what I claim to be new and desire to protect by Letters Patent is:

1. A visual aid for illustrating atomic and molecular structure comprising:
    (a) a spindle,
    (b) a multiplicity of planar members,
    (c) each of said planar members having a central hole acting as a nucleus and adapted to receive said spindle to mount the members thereon one upon the other,
    (d) each of said planar members having indicia illustrating one or more electron orbitals thereon,
    (e) the orbitals on a given planar member having a mean distance from the nucleus differing from that on another planar member, the extent of the orbitals on each member outwardly of the nucleus indicating the mean distance of an electron from the nucleus, and
    (f) means for indicating electrons on said planar members for selective illustration of an atom or collectively with said members combined to illustrate molecules.

2. The device of claim 1 in which each of said planar members is circular.

3. The device of claim 2 in which each of said planar members is transparent.

4. The device of claim 3 in which said means for indicating electrons is a relatively small planar member having adhesive thereon for attachment to said planar members.

5. The device of claim 4 in which said electron indicating means is circular information.

6. The device of claim 5 in which said indicia illustrating an electron orbital is a narrow line.

7. The device of claim 1 in which each of said planar members is transparent.

8. The device of claim 1 in which said means for indicating electrons is a relatively small planar member having adhesive thereon for attachment to said planar members.

9. The device of claim 1 including means for indicating a bond between atoms.

References Cited
FOREIGN PATENTS
5,665    7/1913    Great Britain.

ROBERT W. MICHELL, Primary Examiner

L. ANTEN, Assistant Examiner